United States Patent [19]

De Graaf

[11] Patent Number: 5,464,489
[45] Date of Patent: Nov. 7, 1995

[54] METHOD FOR MANUFACTURING A GREEN RADIAL TIRE USING A TRANSFER UNIT THAT IS MOVABLE DURING PRESSING

[75] Inventor: Martin De Graaf, Emst, Netherlands

[73] Assignee: Veluwse Machibe Industrie B.V., Gelriaweg, Netherlands

[21] Appl. No.: 246,883

[22] Filed: May 20, 1994

[30] Foreign Application Priority Data

May 26, 1993 [NL] Netherlands ............... 9300893

[51] Int. Cl.$^6$ .................................................. B29D 30/28
[52] U.S. Cl. ................. 156/126; 156/130.3; 156/406.2; 156/408
[58] Field of Search ................. 156/126, 406.2, 156/130.3, 96, 111, 396, 408–413

[56] References Cited

U.S. PATENT DOCUMENTS

| | | |
|---|---|---|
| 2,341,988 | 2/1944 | Heintz . |
| 3,423,272 | 1/1969 | Sornsen ................... 156/410 |
| 3,475,254 | 10/1969 | Henley ................... 156/401 |
| 3,767,509 | 10/1973 | Gazuit ................... 156/415 |
| 3,819,449 | 6/1974 | Caretta . |
| 3,865,669 | 2/1975 | Todd ................... 156/394 |
| 3,888,720 | 6/1975 | Habert ................... 156/414 |
| 3,944,458 | 3/1976 | Branick . |
| 3,976,532 | 8/1976 | Barefoot ................... 156/405 |
| 4,039,366 | 8/1977 | Yabe . |
| 4,057,455 | 11/1977 | Klose ................... 156/410 |
| 4,170,509 | 10/1979 | Kubinksi ................... 156/405 |
| 4,190,482 | 2/1980 | Yabe ................... 156/403 |
| 4,288,265 | 9/1981 | Pacciarini et al. ................... 156/126 |
| 4,306,931 | 12/1981 | Klose . |
| 4,402,782 | 9/1983 | Klose et al. ................... 156/414 |
| 4,445,963 | 5/1984 | Klose et al. ................... 156/420 |
| 4,469,546 | 9/1984 | Klose et al. ................... 156/406.2 |
| 4,667,574 | 5/1987 | Felten . |

FOREIGN PATENT DOCUMENTS

| | | |
|---|---|---|
| 804577 | 1/1969 | Canada . |
| 0223317B1 | 4/1989 | European Pat. Off. . |
| 2289327 | 10/1975 | France . |
| 57-208231 | 12/1982 | Japan . |
| 49104 | 10/1986 | Japan . |
| 2092100 | 8/1982 | United Kingdom . |

*Primary Examiner*—Geoffrey L. Knable
*Attorney, Agent, or Firm*—Pennie & Edmonds

[57] ABSTRACT

A transfer unit for supporting and moving a tread/belt assembly is provided with a stable cylindrical base with a longitudinal axis and with a passage part provided with arms which are laterally arranged on the base body and which extend essentially in a longitudinal direction. Gates for radially admitting rollers of the pressure roller unit are formed by the base body and the arms and have a pass through opening which is located between the free ends of two adjacent arms.

2 Claims, 8 Drawing Sheets

Prior Art

METHOD FOR MANUFACTURING A GREEN RADIAL TIRE USING A TRANSFER UNIT THAT IS MOVABLE DURING PRESSING

FIELD OF THE INVENTION

The invention relates to an apparatus for manufacturing a green radial pneumatic tire, which apparatus is provided with a construction drum for a tread with a belt for the radial pneumatic tire, with a carcass drum for carrying a carcass with beads and side walls for the radial pneumatic tire, with an annular transfer unit movable along a path for transferring the annular tread/bead assembly to the carcass drum, which transfer unit is provided with a passage part for surrounding the drums, and with a pressure roller unit with at least one roller rolling the belt/tread assembly against the carcass with the beads and the side walls, the passage part being provided with a gate for radially admitting each roller to the carcass with beads and side walls, the pressure roller unit being provided with means for displacing each roller radially through the gate.

The invention further relates to a transfer unit for use in such an apparatus and to a method for manufacturing a green radial tire.

BACKGROUND OF THE INVENTION

An apparatus as discussed above is known from European patent EP-B1-0.223,317. In this known apparatus that which is needed for pressing the belt/tread assembly and the carcass with the beads and the side walls is realized by a pressure roller unit with a static pressing roller with at least one roller or group of coaxial rollers radially movable through the gate in the passage part. In this known apparatus the transfer unit stays in place around the carcass drum during pressing, so that a relatively short period is needed for the manufacture of a green radial tire.

By a carcass drum can be understood a carcass construction drum for a carcass with beads and side walls or a drum for expanding an airtight carcass with beads and side walls.

Green radial tires manufactured by apparatuses of the type as named in the preamble can be divided into so-called tread over sidewall construction and sidewall over tread construction. These two constructions will henceforth be referred to as TOS (tread over sidewall) and SOT (sidewall over tread) respectively.

In the case of a radial SOT pneumatic tire after the tread/belt assembly has been placed on the carcass with beads and sidewalls, the sidewalls are bent in such a way that they cover the edges of the tread after which the mutual pressing of the tread/belt assembly against the carcass with beads and sidewalls takes place with the help of the pressure roller unit. For some tire constructions it is in this case desirable to roll the sidewalls over the entire length of the bead up to the so-called shoulder of the green radial pneumatic tire.

In the case of a radial TOS pneumatic tire the carcass is expanded together with the sidewalls before the tread/belt assembly can be placed and the rolling on by the pressure roller unit takes place.

Nowadays more and more radial pneumatic tires are manufactured having a large tire width and a very low tire section height. Particularly for passenger cars the demand for these so-called 'High Performance' tires has increased.

In practise it has emerged that the apparatus known from EP-B1-0.223.317 especially in the manufacture of very wide radial pneumatic tires, TOS as well as SOT, does not offer optimal manufacturing efficiency. Furthermore, the wish to roll the sidewalls over the entire length of the bead up to the shoulder of the radial pneumatic tire cannot be fulfilled.

SUMMARY OF THE INVENTION

It is an object of the present invention to provide an apparatus for the manufacture of a green radial pneumatic tire, whereby a reproducible adhesion of the tread/belt tire, stitching of the tread/belt assembly onto the carcass with the beads and the sidewalls can also be realized for wider tires in an efficient way.

It is a further object of the invention to provide an apparatus for the manufacture of a green radial pneumatic tire which is universally useable, in other words suitable for manufacturing SOT and TOS pneumatic tires of various widths.

It is a further object of the invention to provide a constructively simple transfer unit for use in such an apparatus.

It is a further object of the invention to provide a time efficient method for manufacturing a green radial pneumatic tire.

For this purpose an apparatus of the kind named in the preamble is provided, characterized in that seen in a direction parallel to the direction of movement of the passage part near the carcass drum the gate of the passage part is provided on one side with a pass through opening for each roller. The invention is based on the understanding that the pressure roller unit of the known apparatus is not or not in all cases capable of carrying out the axial movement necessary when pressing wider tires. This is because every roller can come into contact with those parts of the passage part which determine the gate. This possible contacting could be remedied by moving the transfer unit up to an axial distance from the carcass drum before pressing or by making the gate sufficiently large. In the first option, the manufacturing time increases however and in the second option the transfer unit is not only larger but also requires a longer path. By providing, according to the invention, the gate on one side with a pass through opening for each roller, as seen in the direction of movement of the the passage part, not only the contacting of the pressure roller unit against the passage part can be prevented, but also the manufacturing time of a pneumatic tire and the wear and tear of, among other things, the path is limited. Contacting is not only prevented by the gate being unbound on at least one side, by virtue of which the pressure roller unit has an axial freedom of movement which is not limited by the passage part, but also because during the pressing the transfer unit can be moved up to an axial distance from the carcass drum, in which as a consequence of the pass through opening the roller does not come into contact with the passage part.

An embodiment of an apparatus according to the invention is characterized in that the pressure roller unit consists of at least one pair of dynamic rollers which follow the tire contour, which are movable in an axial as well as in a radial direction relative to the carcass drum for rolling the belt/tread assembly against the carcass with the beads and the side walls. Particularly with such a dynamic pressure roller unit, which has a considerable axial freedom of movement, the apparatus is also suitable for manufacturing wide radial pneumatic tires.

In an embodiment of an apparatus according to the invention, which is characterized in that the pressure roller unit consists of at least one pair of dynamic rollers which follow the tire contour for rolling the edge strips of the tread/belt assembly and the carcass with the side walls against each other and of at least one static—in other words only movable in a radial direction—roller for rolling the central parts of the tread/belt assembly and the carcass with side walls against each other, the passage part having both for each pair of dynamic rollers and for each static roller a gate with a pass through opening on one side, as seen in a direction parallel to the direction of movement of the passage part near the carcass drum, the passage part has two separate gates each with one pass through opening. Although this embodiment of the apparatus according to the invention can manufacture several radial pneumatic tires in a sufficiently reproducible fashion, it is possible that the reproducibility of the placing of the tread/belt assembly on the carcass drum for wide radial pneumatic tires which have to be manufactured with very close tolerance, leaves much to be desired as a result of there being two pass through openings present in the transfer unit which can have a negative effect on the stability thereof. This problem is solved by a further embodiment of the apparatus according to the invention in that the transfer unit is formed by a massive cylindrical base body with a longitudinal axis, and in that the passage part is provided with a number of arms being mounted laterally angularly spaced on the base body, and extending substantially in longitudinal direction, a gate with on one side a pass through opening being formed between two adjacent arms. The cylindrical base body provides the transfer unit with sufficient stability, regardless of the number of gate forming arms.

The invention further relates to a transfer unit for transferring the tread with the belt from a tread construction drum to a carcass drum for use in an apparatus according to the invention, the transfer unit being provided with a passage part having a gate for each roller or each pair of dynamic rollers for surrounding the drums and with segments displaceable to or from the drums respectively, for concentrically and at any rate over nearly the whole surface supporting the annular tread/belt assembly, which is characterized in that, seen in a direction parallel to the direction of movement of the passage part near the carcass drum, the gate of the passage part is provided on one side with a pass through opening for each roller or each pair of dynamic rollers. An apparatus for manufacturing radial pneumatic tires provided with such a transfer unit is among other things universally applicable in a time efficient fashion.

When the displaceable segments are arranged on the arms then the transfer unit need not be displaced between placing the tread/belt assembly on the carcass drum and the pressing by the pressure roller, which shortens the manufacturing time. Preferably the cross section of the cylindrical base body is a circle.

According to the invention there is also provided a universal method for manufacturing a green radial pneumatic tire comprising a tread with a belt, a carcass with beads and side walls, in a time efficient manner, in which method the tread with the belt are arranged on a tread construction drum, the carcass with the beads and the side walls are arranged on the carcass drum, the tread/belt assembly is taken by a transfer unit with a passage part from the tread construction drum, the transfer unit is moved over a path to the carcass drum, the transfer unit places the tread/belt assembly on the carcass with the beads and the side walls, the tread/belt assembly is pressed against the carcass with the beads and the side walls by a pressure roller unit with at least one roller, each roller being moved through a gate in the passage part from beyond the transfer unit up to the carcass with beads and side walls and the pressing taking place during a period sufficient for adhering the tread/belt assembly to the carcass with the beads and the side walls, thus forming the green radial pneumatic tire, each roller being moved from the carcass to beyond the transfer unit after completed pressure and the green radial pneumatic tire is taken from the carcass drum by the transfer unit, which is characterized in that during the pressing of the tread/belt assembly onto the carcass with the beads and the side walls the transfer unit is transferred to a distance from the carcass drum. Because the transfer unit is movable during pressing time is saved with respect to the method, in which the movement and the pressing take place at separate times.

A further time saving is gained in an embodiment of the method according to the invention, in which for completing the pressing the transfer unit is transferred to about the carcass drum. The pressing can be adjusted such that when the transfer unit is placed around the carcass drum just before the pressing is completed, the pressure roller unit is not effected in a negative way by the transfer unit.

BRIEF DESCRIPTION OF THE DRAWINGS

By way of example the invention will now be described in more detail with reference to the accompanying drawing in which some embodiments of the apparatus and method for the manufacture of a green radial pneumatic tire and a transfer unit for use in such an apparatus are shown.

In the drawing

DETAILED DESCRIPTION OF THE INVENTION

Figure 1:
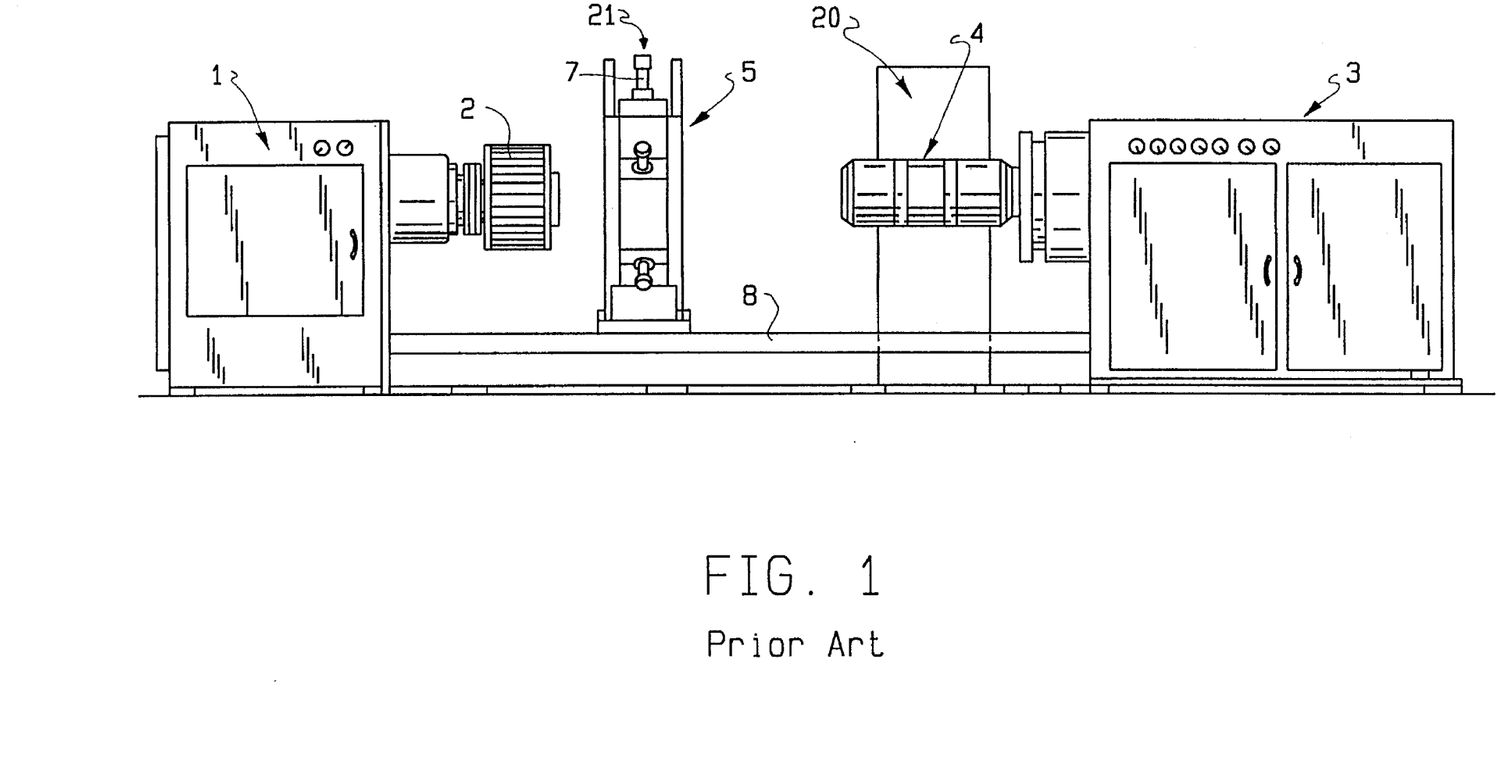
FIG. 1 shows a known apparatus for manufacturing a green radial pneumatic tire.

The known apparatus for manufacturing a green radial pneumatic tire schematically represented in FIG. 1 is provided with a tread construction apparatus 1 for constructing a belt/tread assembly, not shown, for a green pneumatic tire on a tread construction drum 2. The apparatus is further provided with a carcass construction apparatus 3, not shown, for constructing or expanding a carcass on a carcass drum 4 with beads and sidewalls for a green pneumatic tire. A transfer unit 5 with a base body which consists of a passage part 21 is movable over a path 8 to and from a position in which the passage part 21 reaches coaxially around the tread construction drum 2. The passage part 21 is provided with supporting segments 6 (see FIG. 2) radially inwardly movable by cylinders 7 to clamp the annular belt/tread assembly inside the support segments 6 and thus to support it concentrically and at least over substantially the whole surface. The number of supporting segments 6 can, for example, be six.

After the belt/tread assembly has been clamped between the support segments 6 the diameter of the tread construction drum 2 is radially reduced so that the belt/tread assembly is released from the tread construction drum 2 and is only supported by the support segments 6. Then the transfer unit 5 is moved over the path 8 until the passage part 21 reaches coaxially around the carcass drum 4 with the carcass with the beads and the sidewalls on it. Next, the carcass with the beads and the sidewalls is expanded up to against the belt/tread assembly, the sidewalls extending in axial direction from the carcass drum 4 past the other parts for the green pneumatic tire. After that the support segments 6 of the passage part 21 are radially outwardly moved, so that the tread/belt assembly is released from the support segments 6. Depending on whether the tire which is eventually to be formed is of the SOT or TOS type, the sidewalls are or are not respectively bent up to over the tread/belt assembly. After this the belt/tread assembly is pressed against the carcass with the beads and the sidewalls by means of a pressure roller unit 20 with adjustable strength whilst simultaneously rotating the carcass drum 4 with the carcass with the beads and the sidewalls and the belt/tread assembly on it, so that these stitch to each other for forming the green radial pneumatic tire which is then ready for further treatment.

Figure 2:
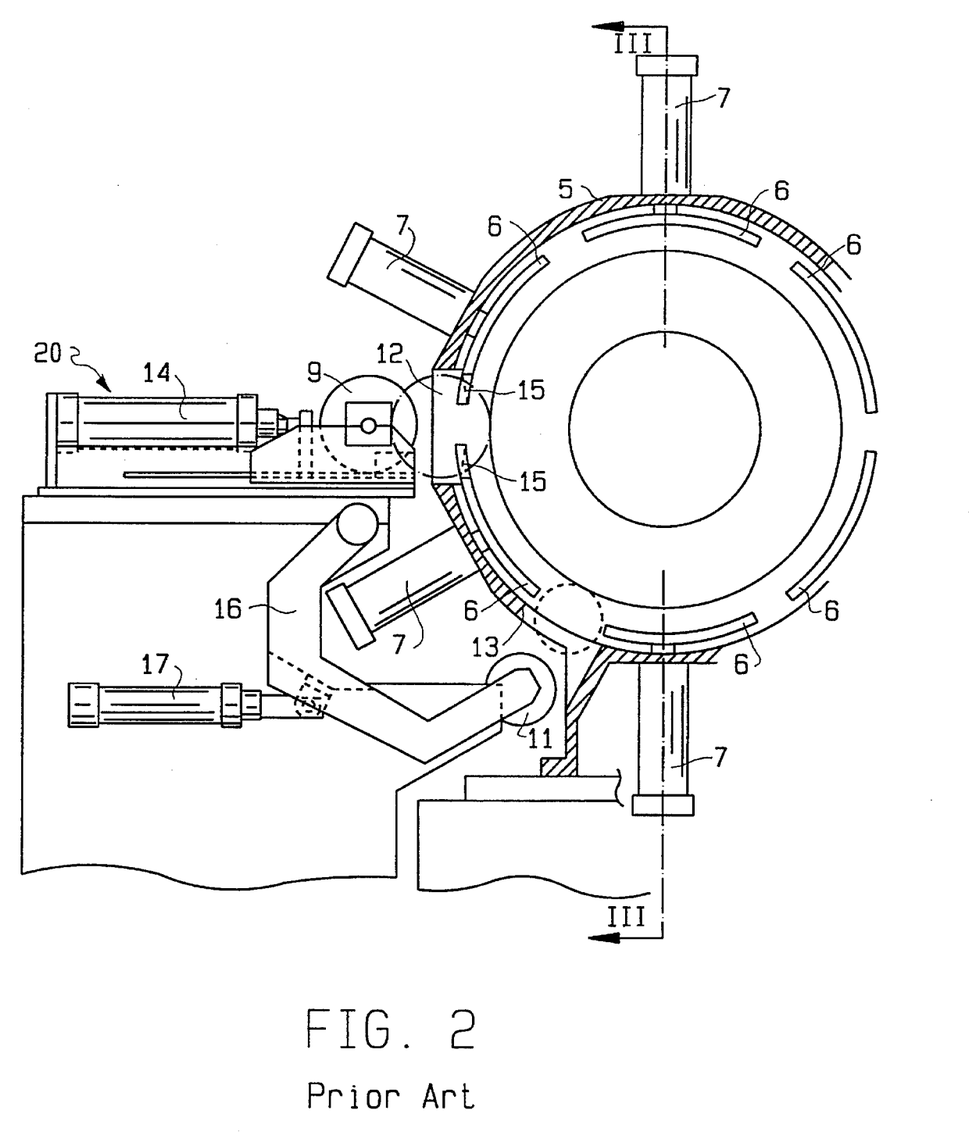
FIG. 2 schematically shows a known transfer unit and a known pressure roller unit seen from the tread construction drum, FIG. 3 schematically shows the known transfer unit and the rollers of the pressure roller unit according to the line III—III in FIG. 2, FIG. 4 schematically shows an embodiment of a transfer unit according to the invention in front view with a base body with lateral arms, FIG. 5 schematically shows the transfer unit of FIG. 4 in side view, FIGS. 6, 7 and 8 schematically show the position of the transfer unit in the apparatus for manufacturing a green radial pneumatic tire in a few steps of a method for manufacturing a green radial pneumatic tire according to the invention, and FIG. 9 schematically shows the range of movement of one of the rollers of a pair of dynamic rollers which follow the tire contour.
Figure 3:
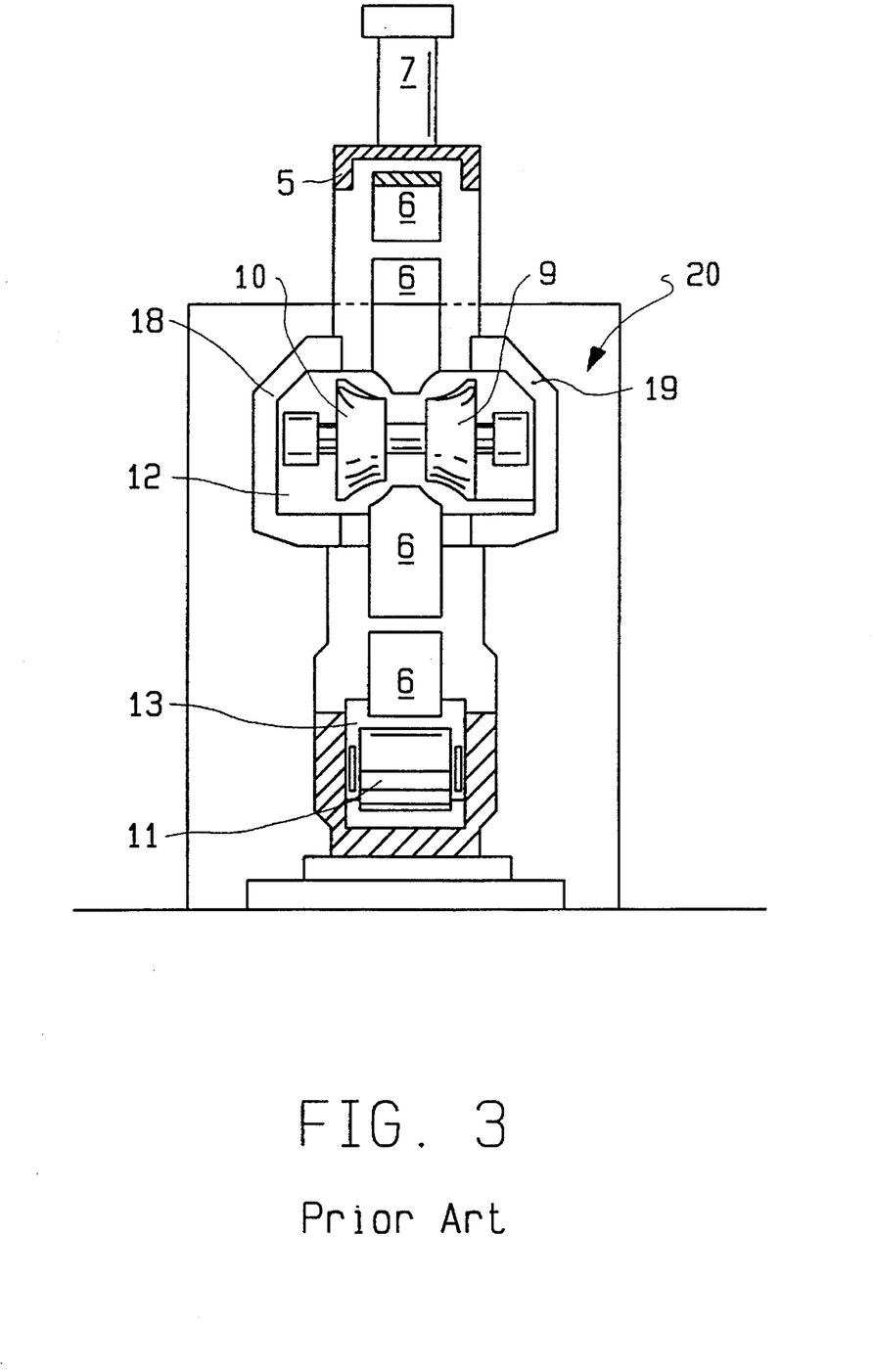

The pressure roller unit 20 can be formed by at least one roller or group of coaxial rollers. In FIGS. 2 and 3 an embodiment of a known transfer unit and a pressure unit are schematically shown as seen from the tread construction drum and in side view respectively, in which the pressure roller unit 20 is provided with two coaxial rollers 9 and 10 and a cylindrical roller 11. The mutual pressing of the tread/belt assembly and the carcass with the beads and the sidewalls by the rollers (9, 10 and 11) takes place because the rollers can be put through gates which are provided in the base body or the passage part of the transfer unit. The two coaxial rollers 9 and 10 can be put through a gate 12 by a cylinder 14 and the cylindrical roller 11 is put through a gate 13 by a cylinder 17 and a swivelling arm 16.

In the exemplary embodiment as shown in the drawing the rollers 9 and 10 (FIG. 3) are slidable up to and through the gate 12 in the circumference of the base body or passage part of the transfer unit 5 by the cylinder 14 according to FIG. 2 up to the position pressing against the tread/belt assembly which is shown by dotted lines. The rollers 9 and 10 (FIG. 3) are thereby radially displaced against the tread and are, for example, truncated-conically shaped with a concave arch-shaped axial cross section in order to press the edge strips of the tread into the correct form. To admit these rollers and still to grasp the tread/belt assembly over a surface which is as large as possible, the adjacent ends of the adjacent segments 6 of the passage part are provided with recesses 15.

By the double-acting pressure cylinder 14 the rollers 9 and 10 are retractable to the free position shown by continuous lines. Moreover, the group of coaxial rollers can be placed parallel to the axis of the carcass drum in another position relative to the width of the tire tread.

Besides, in the exemplary embodiment as shown in the drawing the roller 11 can be swivelled to and through the gate 13 in the circumference of the passage part of the transfer unit 5 by the cylinder 17 and the swivelling arm 16 according to FIG. 2 up to the position pressing against the tread/belt assembly, shown in dotted lines. Thus the roller 11 is moved from the free position shown by continuous lines according to an arch-shaped path which points almost radially on the tread. By the double-acting pressure cylinder the roller is retractable to the free position. In order to admit the roller 11, the adjacent ends of the adjacent segments 6 of the passage part are placed further apart than the ends of the segments which are not placed near a gate. The roller 11 is cylindrical or barrel-shaped to grasp the central part of the tread.

Because of the gates 12 and 13 in the circumference of the passage part the transfer unit can remain in position whilst rolling the tread/belt assembly onto the carcass, while the rollers can still be pressed against the tread. By this remaining in place of the transfer unit 5 loss of time is avoided which would occur if the transfer unit had to be removed from the carcass drum 4 to be able to press the carcass with the beads and the side walls against the belt/tread assembly, while after pressing, time would again be needed for placing the transfer unit around the carcass drum 4 for the removal of the then completed green pneumatic tire.

Moving the roller or group of coaxial rollers parallel to the axis of the carcass drum in this known apparatus can be reduced by parts of the passage part which adjoin the gates, in particular the brackets 18 and 19 (see FIG. 3). This hampers the manufacture of wide, 'High Performance' tires of both the TOS as well as, but in particular the SOT type.

This limitation of the freedom of movement of the rollers of the pressure roller unit is, according to the invention, partially removed by providing the gate for each roller on at least one side with a pass through opening, in other words the gate is made receding. The limitation of the freedom of movement of each roller is not only at least partially prevented in that the gate is unbounded on at least one side, the pressure roller unit thus having an axial freedom of movement in that direction which is not limited by the passage part, but also in that during pressing the transfer unit can be moved up to an axial distance away from the carcass drum, as a consequence neither one of the rollers coming into contact with the passage part.

Figure 4:
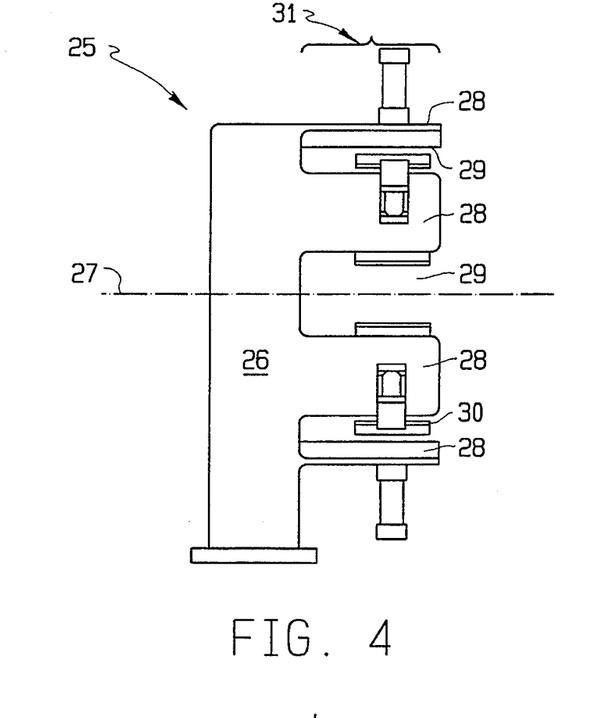
Figure 5:
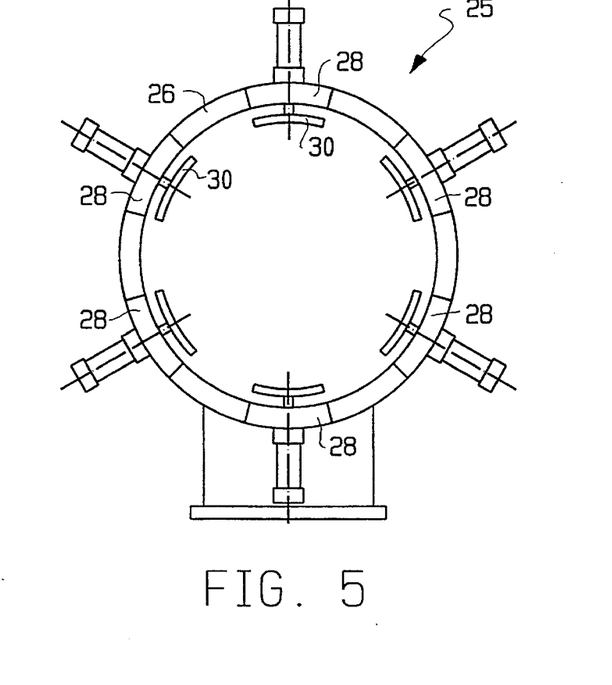

An embodiment of the transfer unit according to the invention is shown in FIGS. 4 and 5. Here the transfer unit 25 is provided with a stable cylindrical base body 26 with a longitudinal axis 27 and with a passage part 31. The passage part 31 is provided with arms 28 which are laterally arranged on the base body 26 and which extend essentially in a longitudinal direction. The gates 29 for radially admitting each roller of the pressure roller unit are formed by the base body 26 and the arms 27 and have a pass through opening which is located between the free ends of two adjacent arms. The stability of the transfer unit 25 is ensured by this construction, irrespective of the number of openings. In this way an exact and reproducible mutual positioning of the tire parts is guaranteed. The embodiment of the transfer unit according to FIGS. 4 and 5 can guarantee this stability, because, as opposed to the known transfer unit in which one body fulfills the function of admitting the rollers as well as the function of base body for providing stability, the embodiment of FIGS. 4 and 5 show a transfer unit with a base body which takes care of the stability of the transfer unit and with a separate passage part 31 for the admission of the rollers of the pressure roller unit.

In the embodiment according to FIGS. 4 and 5 the segments 30 for supporting the tread/belt assembly can be arranged on the base body, but then the transfer unit has to be moved a short distance in order to place the rollers of the pressure roller unit opposite the gates 29. In order to avoid this time-consuming movement the segments 30 are preferably arranged on the arms 28.

In the invention discussed above the transfer unit can have all sorts of cross sections which enable placing the transfer unit concentrically around the tread- and carcass drum. If, for example, six support segments (6, 30) are used, then a hexagonal cross section is possible. Irrespective of the number of support segments an annular cross section is preferable from the point of view of constructive measures.

Figure 9:
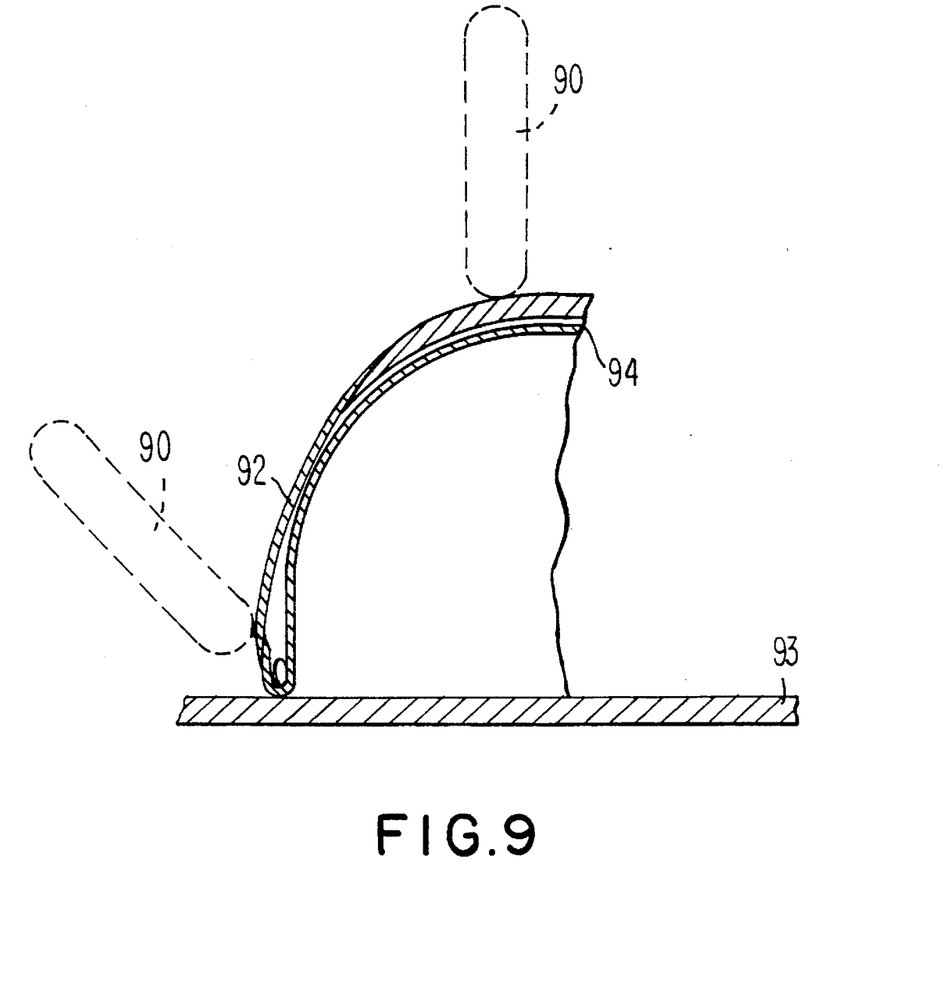

Although the embodiments described above are described on the basis of just a few possible embodiments of the pressure roller unit, it is clear to a person skilled in the art that as a consequence of the enlarged freedom of movement of the rollers, a pair of dynamic rollers which follow the tire contour can particularly be used. During rolling these dynamic rollers move over an axial and radial area which is relatively large in comparison to the range of movement of the known coaxial rollers. Thus these dynamic rollers are extremely suitable for manufacturing wide High Performance tires. Such dynamic rollers which follow the tire contour are known per se. In FIG. 9 the range of movement of one 90 of such rollers is shown. In FIG. 9 91 is the tread, 92 a sidewall, 93 a part of the carcass drum which supports the expanded carcass 94. The roller 90 is movable between positions in which the roller 90 is shown by dotted lines.

Depending on the width of the tire and the wish to be able to roll on the sidewalls as well, a pressure roller unit preferably consists of a static barrel-shaped roller 11 for rolling on the centre part of the tread/belt assembly against the carcass, the so-called fixing against shifting, and a dynamic pressure roller unit according to the invention consisting of a pair of dynamic rollers which follow the tire contour, for rolling on the rest of the tire from the place where the central barrel-shaped roller 11 has touched the tread up to the bead of the tire, by following the contour of the green tire, formed by the shoulder of the tread, the overlapping of side and tread edge and the sides in the sidepieces of the tire up into the bead zone.

Furthermore every possible combination of static and dynamic rollers can be used which together form a pressure roller unit in the apparatus according to the invention.

Figure 6:
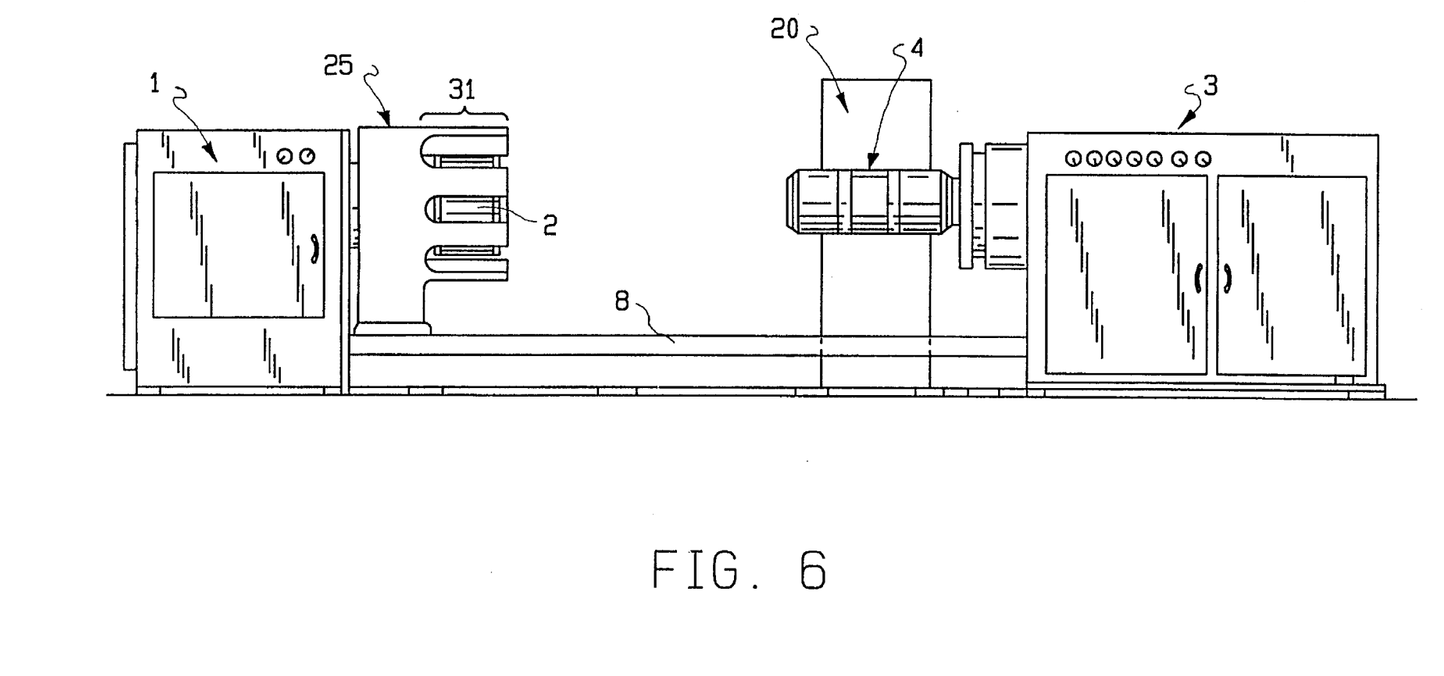
Figure 7:
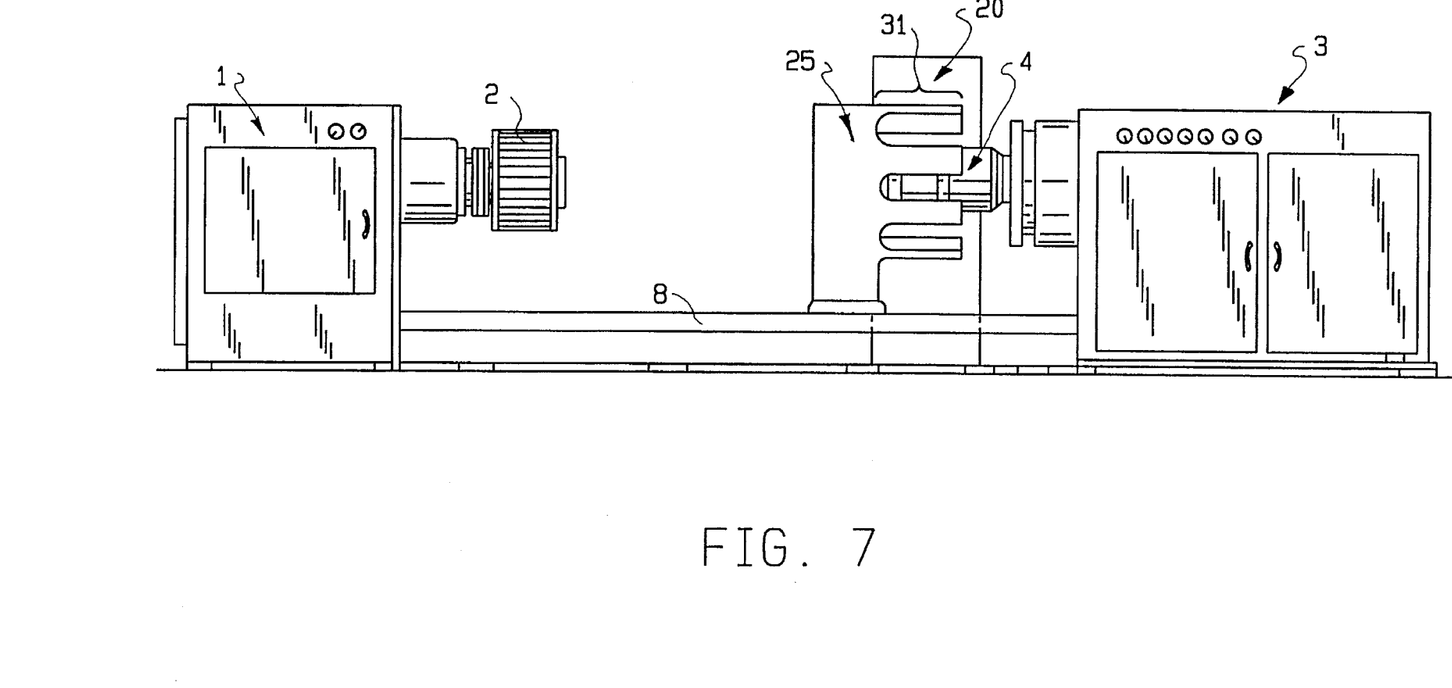
Figure 8:
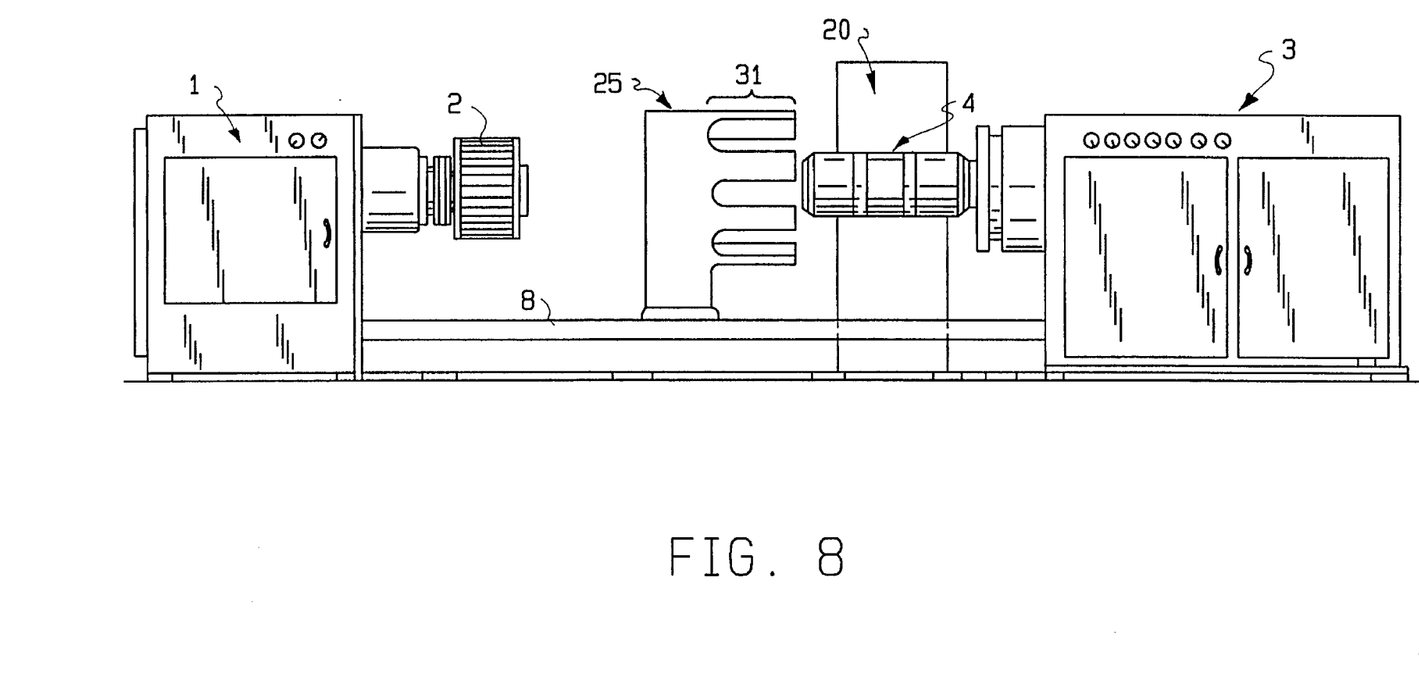

On the basis of FIGS. 6, 7 and 8 an embodiment of a method for manufacturing a green, radial pneumatic tire according to the invention will be described schematically. In this method the tread and the belt are arranged on the tread construction drum 2. The carcass with the beads and the sidewalls are arranged on the carcass drum 4. The tread/belt assembly is taken from the tread construction drum 2 by the transfer unit 25 with a passage part 3 and is moved over a path 8 around the carcass drum 4. The transfer unit 25 places the tread/belt assembly onto the carcass with the beads and the sidewalls after which the tread/belt assembly is pressed by the pressure roller unit 20 with at least one roller radially movable up to against the carcass drum against the carcass and the beads and the sidewalls. Thus each roller is moved through the gates in the passage part from beyond the transfer unit up to the carcass. According to the invention the transfer unit 25 can be moved to a distance away from the carcass drum, as is shown in FIG. 8, during pressing of the tread/belt assembly against the carcass with the beads and the sidewalls, in order to give the rollers of the pressure unit 20 maximum freedom of movement. After completed pressing each roller of the carcass is moved to beyond the transfer unit and the green radial pneumatic tire is taken by the transfer unit from the carcass drum.

Pressing by the pressure unit can be adjusted in such a way that shortly after the pressing has been effectuated the transfer unit is removed from the carcass drum and shortly before the completion of the pressing is again placed up to around the carcass drum, so that during moving no extra time is lost.

I claim:

1. Method for manufacturing a green radial pneumatic tire comprising a tread with a belt defining a tread-belt assembly and, a carcass with beads and side walls, in which method the tread with the belt is arranged on a tread constructing drum, the carcass with the beads and the side walls is arranged on a carcass drum, the tread-belt assembly is taken by a transfer unit with a passage part from the tread constructing drum, the transfer unit is transferred over a path to a first location surrounding the carcass drum, the transfer unit places the tread-belt assembly on the carcass with the beads and the side walls, the tread-belt assembly is pressed against the carcass with the beads and the side walls by a pressure unit with at least one roller, each roller being displaced through a gate in the passage part of the transfer unit from beyond the transfer unit up to against the carcass with beads and side walls and the pressure taking place during a period of time sufficient for adhering the tread-belt assembly to the carcass with the beads and the side walls, thus forming said green radial pneumatic tire, said period of time having a first part and a subsequent second part, each roller being displaced from the carcass after said period of time and the green radial pneumatic tire is taken from the carcass drum by the transfer unit, characterized in that after starting the pressing of the tread-belt assembly onto the carcass with the beads and the side walls and during the first part of said period of time, the transfer unit is transferred along said path to a second location spaced from the carcass drum to permit said pressure unit to move freely, during said period, along said tread-belt assembly and carcass with the beads and the side walls without interference with said transfer unit.

2. Method according to claim 1, characterized in that before completing the pressing of the tread-belt assembly onto the carcass with the beads and the side walls and during the second part of said period of time, the transfer unit is transferred to said first location surrounding the carcass drum for removal of the green radial pneumatic tire.

\* \* \* \* \*

UNITED STATES PATENT AND TRADEMARK OFFICE
CERTIFICATE OF CORRECTION

PATENT NO.   :   5,464,489

DATED        :   November 7, 1995

INVENTOR(S)  :   Martin De Graaf

It is certified that error appears in the above-identified patent and that said Letters Patent is hereby corrected as shown below: On the title page: Item [73]

Name of assignee should read: Veluwse Machine Industrie B.V.

Signed and Sealed this

Ninth Day of July, 1996

Attest:

BRUCE LEHMAN

Attesting Officer

Commissioner of Patents and Trademarks